J. BOWEN.
DOUBLE-BELT POWER.
No. 173,260. Patented Feb. 8, 1876.
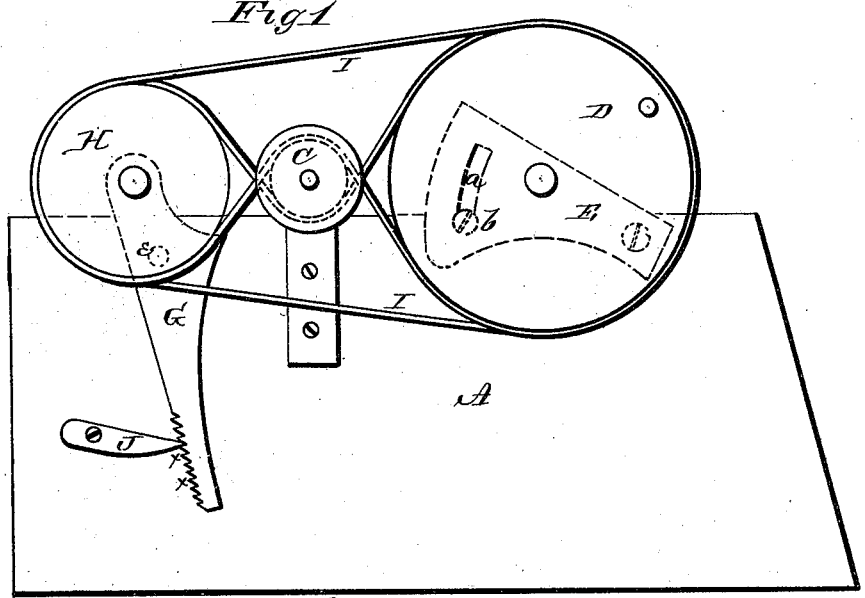
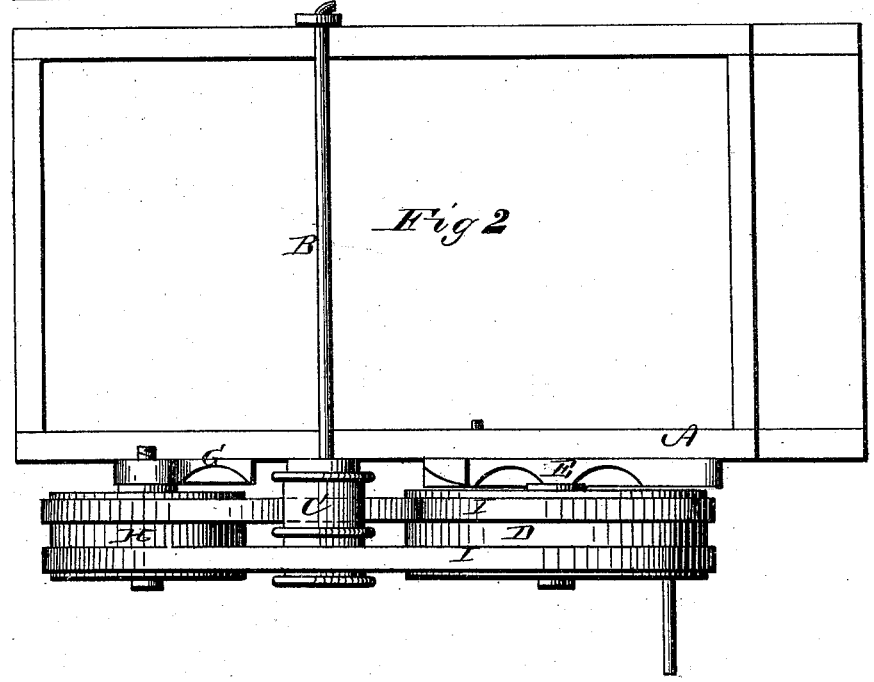
WITNESSES
Franck L. Durand
C. L. Eursh
INVENTOR
Jesse Bowen
By Alexander A Mason
Attorneys.

UNITED STATES PATENT OFFICE.

JESSE BOWEN, OF LANCASTER, OHIO.

IMPROVEMENT IN DOUBLE-BELT POWERS.

Specification forming part of Letters Patent No. 173,260, dated February 8, 1876; application filed July 19, 1875.

*To all whom it may concern:*

Be it known that I, JESSE BOWEN, of Lancaster, in the county of Fairfield and in the State of Ohio, have invented certain new and useful Improvements in Double-Belt Power; and do hereby declare that the following is a full, clear, and exact description thereof, reference being had to the accompanying drawings, and to the letters of reference marked thereon, making a part of this specification.

My invention relates to devices or mechanical movements for driving machinery by hand or other power; and it consists in the construction and arrangement of parts, as will be hereinafter more fully set forth.

In order to enable others skilled in the art to which my invention appertains to make and use the same, I will now proceed to describe its construction and operation, referring to the annexed drawings, in which—

Figure 1 is a side elevation, and Fig. 2 a plan view, of my invention.

A represents any suitable frame-work, in which is the shaft B to be driven, said shaft being provided with a double pulley or spool, C. This pulley is simply an elongated spool with three circumferential flanges, one in the center, and one at each end. On one side of the shaft B, to the frame A, is pivoted a plate, E, having a projecting stud, upon which the driving wheel or pulley D is placed. This plate E is pivoted at one end, and has at the other end a curved slot, *a*, through which a screw, *b*, passes into the frame, to hold it at any point desired. The stud for the wheel D is situated between the pivoting and adjusting points of the plate, so that by adjusting the plate the wheel may be moved up or down, as desired. On the other side of the shaft B is pivoted a lever, G, to the side of the frame, at *e*. From the upper end of this lever projects a stud, upon which is placed a wheel or pulley, H. I I are belts, which pass around the driving pulley or drum D, and around the loose pulley or wheel H. The opposite sides of the belts I are drawn inward, and pressed around the spool C—one on each side of the center flange—so that said belts may pass around the opposite sides of the spool alternately, making the strain upon the spool and shaft equal in opposite directions, and thus relieving shaft from any side strain from the belts. The lower end of the lever G is toothed on its rear or outer side, as shown at *x x*, and a pawl, J, is made to take into said teeth, to hold the lever in proper position. By means of this pawl and toothed lever the belts may be tightened, as required, and when the lever is changed in any way, if the strain of the belts should be more to one side than the other, by adjusting the plate E and wheel D, as above described, this difficulty is easily obviated, making the strain equal on both sides.

I am aware that it is not new to have two belts passing around the shaft in opposite directions; and I do, therefore, not claim such as being, broadly, my invention.

I am aware that a mechanical power is known in which two belts are used in connection with two pulleys, one of which latter is adjustable, and with an intermediate shaft, over which the belts are passed; hence I disclaim such as being, broadly, my invention.

Having thus fully described my invention, what I claim as new, and desire to secure by Letters Patent, is—

1. In a double-belt power, the combination of the lever G, pivoted to the frame A, and having the wheel H journaled to its top, and provided with the teeth *x* on its lower end, and the pawl J, pivoted to the frame, all substantially as and for the purposes herein set forth.

2. In combination with the adjustable wheel H, double spool C, and double belt I, the wheel D and the casting E, pivoted to the frame, provided with the curved slot *a*, and adjusted by means of the set-screw *b*, substantially as and for the purposes herein set forth.

In testimony that I claim the foregoing I have hereunto set my hand this 15th day of July, 1875.

JESSE BOWEN.

Witnesses:
 C. L. EVERT,
 A. N. MARR.